US011360316B2

(12) United States Patent
Ben Yacov

(10) Patent No.: US 11,360,316 B2
(45) Date of Patent: Jun. 14, 2022

(54) AUGMENTED REALITY OPTICAL AND CORRECTIVE LENS SYSTEM

(71) Applicant: Michael Shlomo Ben Yacov, Bnei Brak (IL)

(72) Inventor: Michael Shlomo Ben Yacov, Bnei Brak (IL)

(*) Notice: Subject to any disclaimer, the term of this patent is extended or adjusted under 35 U.S.C. 154(b) by 0 days.

(21) Appl. No.: 17/382,375

(22) Filed: Jul. 22, 2021

(65) Prior Publication Data

US 2021/0349320 A1 Nov. 11, 2021

Related U.S. Application Data

(63) Continuation of application No. PCT/IL2019/051444, filed on Dec. 31, 2019.
(Continued)

(51) Int. Cl.
*G02B 27/01* (2006.01)
*F21V 8/00* (2006.01)

(52) U.S. Cl.
CPC ....... *G02B 27/0172* (2013.01); *G02B 6/0051* (2013.01); *G02B 6/0055* (2013.01); *G02B 6/0076* (2013.01); *G02B 2027/0178* (2013.01)

(58) Field of Classification Search
CPC .......... G02B 27/0172; G02B 6/0051; G02B 6/0055; G02B 6/0076; G02B 2027/0178;
(Continued)

(56) References Cited

U.S. PATENT DOCUMENTS 5,734,357 A * 3/1998 Matsumoto ............ G02B 27/01
345/7
5,886,822 A 3/1999 Spitzer
(Continued)

FOREIGN PATENT DOCUMENTS

CN 103869467 A 6/2014
CN 203773160 U 8/2014
(Continued)

OTHER PUBLICATIONS

PCT International Search Report for App. No. PCT/IL2019/051444 dated May 3, 2020.
(Continued)

*Primary Examiner* — Balram T Parbadia
(74) *Attorney, Agent, or Firm* — Pearl Cohen Zedek Latzer Baratz LLP

(57) ABSTRACT

Augmented reality lenses configured to be light, fit in standard eyeglass frames, have a field of view of 90 degrees and visible light intensity of above 1000 NIT. The lenses receive an encoded light image from an image generator. Transfer optics and an image presenter are integrally formed within the lens. An image presenter curved in one direction having reflective diffraction gratings on a concave surface of the curve and configured to present the encoded light image as a virtual augmented reality image to the eye of the wearer. The transfer optics system also having reflectors and reflective gratings and is configured to propagate image of encoded light from the image generator to the image presenter. The transfer optics system and image presenter are integrally formed in at least one lens of the augmented reality eyeglasses.

12 Claims, 10 Drawing Sheets

Related U.S. Application Data

(60) Provisional application No. 62/796,628, filed on Jan. 25, 2019.

(58) Field of Classification Search
CPC .... G02B 27/01; G02B 27/28; G02B 27/0101; G02B 27/283; G02B 27/286; G02B 27/288; G02B 2027/0114; G02B 5/18; G02B 2027/011; G02B 2027/0123
See application file for complete search history.

(56) References Cited

U.S. PATENT DOCUMENTS

| | | | |
|---|---|---|---|
| 8,233,204 B1 | 7/2012 | Robbins et al. | |
| 9,933,684 B2 | 4/2018 | Brown et al. | |
| 2008/0309586 A1* | 12/2008 | Vitale | G02B 27/0172 345/8 |
| 2013/0021658 A1 | 1/2013 | Miao et al. | |
| 2016/0022138 A1* | 1/2016 | Winsor | G02B 26/106 351/210 |
| 2018/0143427 A1* | 5/2018 | Griffin | G02B 27/0176 |
| 2018/0231784 A1 | 8/2018 | Koudsi et al. | |
| 2018/0356637 A1 | 12/2018 | Hu | |
| 2019/0129182 A1* | 5/2019 | Hu | G02B 6/0035 |
| 2020/0292830 A1* | 9/2020 | Fei | G02B 27/0101 |

FOREIGN PATENT DOCUMENTS

| | | |
|---|---|---|
| CN | 104460002 B | 6/2017 |
| CN | 107870438 | 4/2018 |
| CN | 107870438 A | 4/2018 |
| EP | 2 494 388 B1 | 5/2011 |

OTHER PUBLICATIONS

Office Action of Korean Patent Application No. 10-2021-7026970 dated Dec. 17, 2021.

\* cited by examiner

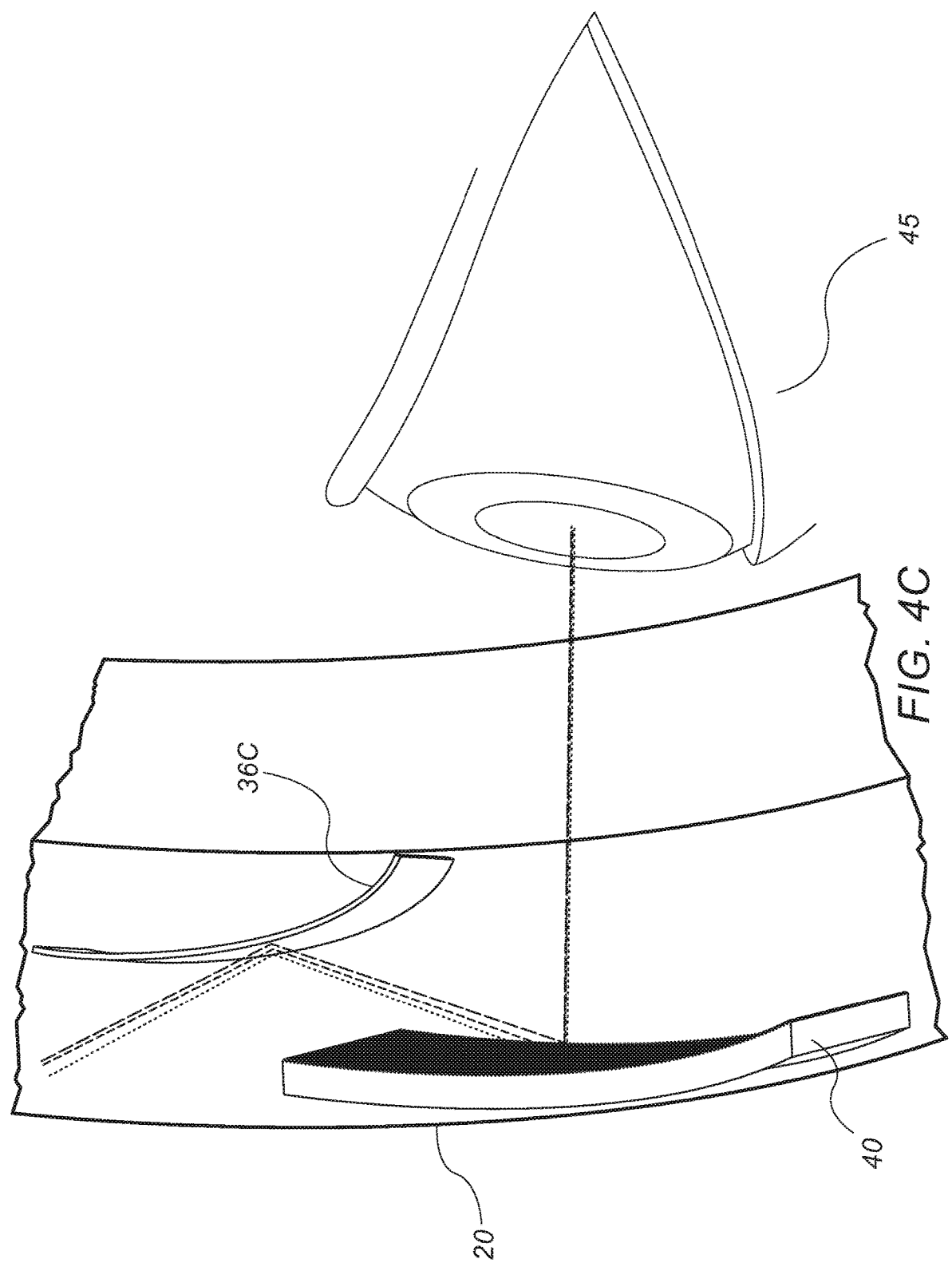

AUGMENTED REALITY OPTICAL AND CORRECTIVE LENS SYSTEM

RELATED APPLICATIONS

This application is a Continuation application of PCT International Application No. PCT/IL2019/051444, International Filing Date Dec. 31, 2019, claiming the benefit of U.S. Provisional Patent Application No. 62/796,628, filed on Jan. 25, 2019, which are hereby incorporated by reference.

FIELD

Embodiments of the disclosure relate to augmented reality (AR) eyeglasses.

BACKGROUND

Augmented reality AR commonly refers to immersive reality formed by integrating sensory input received from a natural, real environment, with additional computer-generated sensory input, hereinafter also referred to as AR input, that adds to, or augments, the natural environment. AR input is typically visual, auditory, and/or olfactory, and may be a combination of more than one sensory input. Whereas augment refers to adding to, and AR input typically comprises constructive input, AR input may be destructive input that sequesters features of the real environment. Visual AR input, which first appeared as heads-up displays generated by fighter pilot helmets, is most commonly associated by the public at large with AR eyeglasses, which provide a wearer with visual AR images that overlay a scene of the real environment that the wearer sees through the eyeglasses.

SUMMARY

An aspect of an embodiment of the disclosure relates to providing AR eyeglasses that are relatively compact, lightweight, and comfortable to wear, which are operable to generate an AR image, in an eye box characterized by a relatively wide field of view (FOV). The AR eyeglasses may further comprise optical appliques configured for vision correction of the wearer and mounted on a lens of the AR eyeglasses. In an embodiment the wide FOV AR eyeglasses, which may be referred to as WIFAR glasses, or simply WIFAR, comprise an image generator and transfer optics that receives an image from the image generator and transfers the image to a presentation element, hereinafter optionally referred to as an "image presenter", for presentation as a virtual augmented reality image to an eye of a wearer.

The image generator optionally comprises compact configuration of reflective diffraction waveguides that direct light from a light source to an image maker, optionally a liquid crystal on silicon (LCOS) image maker, and from the image maker to the transfer optics, hereinafter also known as a transfer optics system. The image generator, in some embodiments, comprises an organic light emitting diode (OLED). The transfer optics may comprise reflective diffraction gratings and non-diffractive reflectors optionally integrally formed in a lens of WIFAR. The image presenter may comprise reflective diffraction gratings and may also be integrally formed in the lens comprising the transfer optics. In some embodiments, the reflective diffraction gratings and image presenter are curved. The image generator, transfer optics and image presenter may cooperate, in accordance with an embodiment to generate a virtual augmented reality image in an eye box of WIFAR having an FOV of about 90 degrees. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

FIGS. 4A, 4B and 4C schematically show the lens of WIFAR and elements of transfer optics and an image presenter integrally formed in the lens, in accordance with an embodiment of the disclosure;

DETAILED DESCRIPTION

Figure 1:
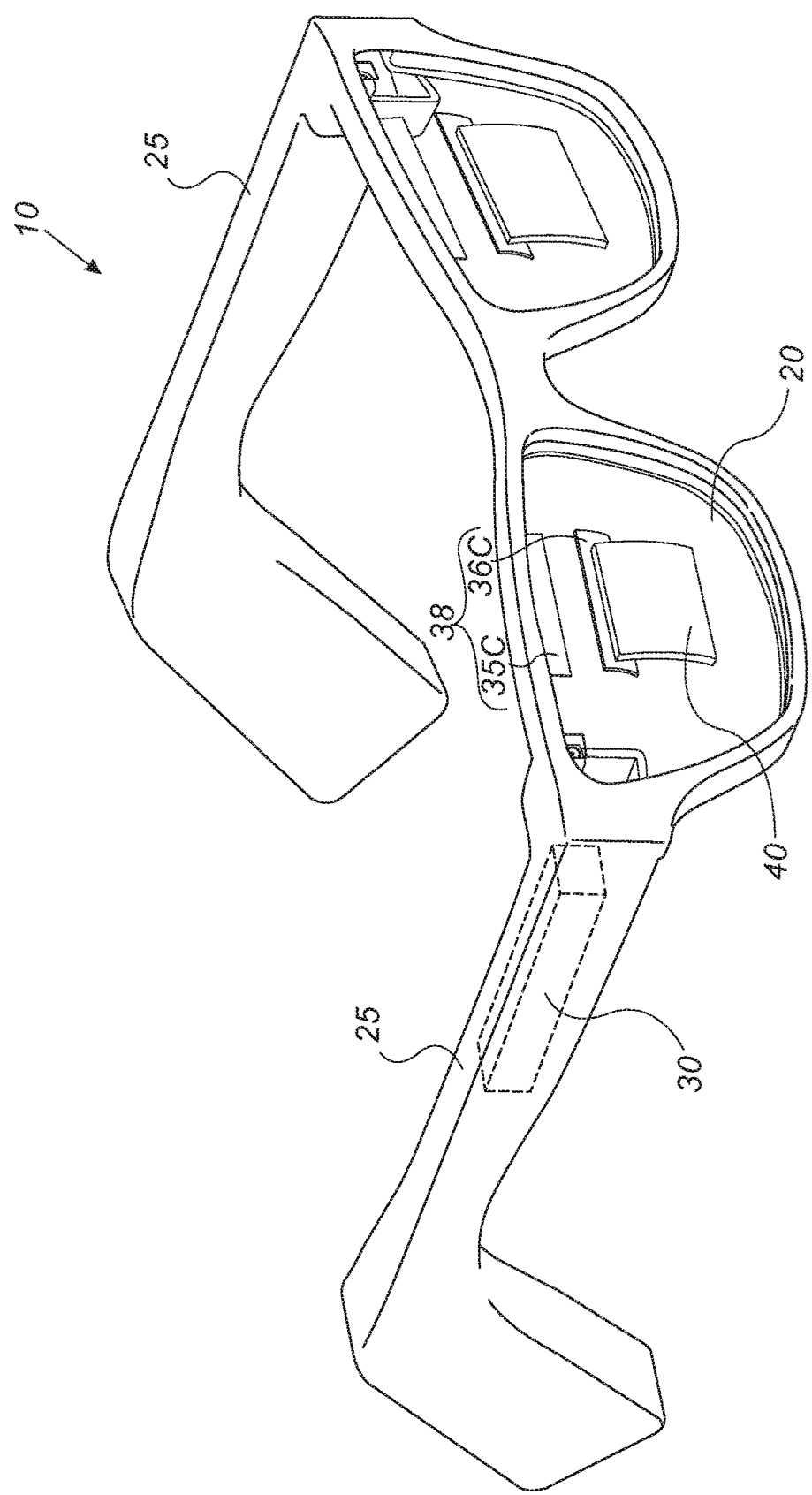
FIG. 1 schematically shows a perspective view of WIFAR eyeglasses, in accordance with an embodiment of the disclosure.
Figure 2A:
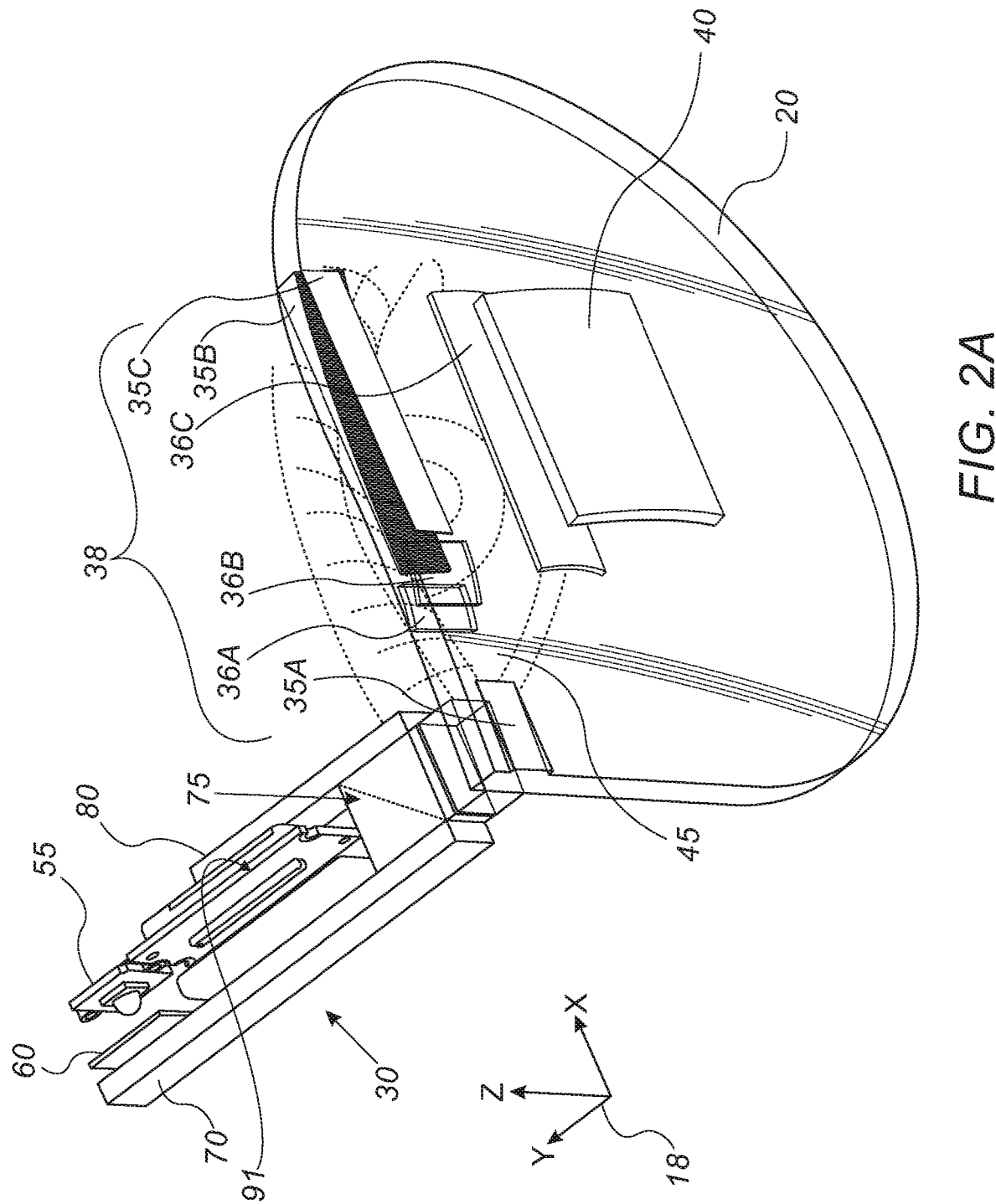
FIG. 2A schematically shows a perspective front view of a lens and an image generator shown in FIG. 1, in accordance with an embodiment of the disclosure.
Figure 2B:
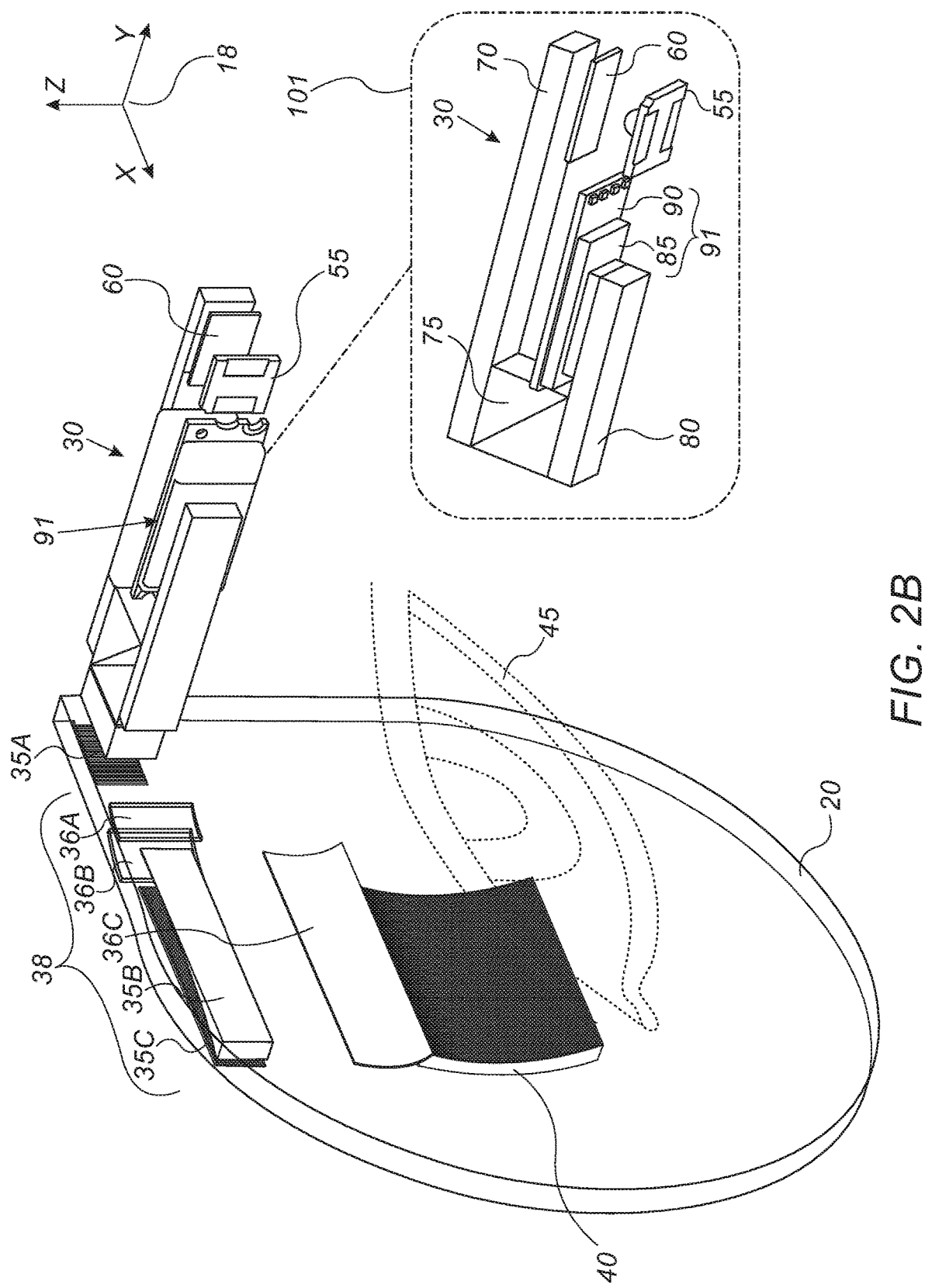
FIG. 2B schematically shows a perspective rear view of the WIFAR lens and image generator as seen in FIG. 2A, in accordance with an embodiment of the disclosure.
Figure 3:
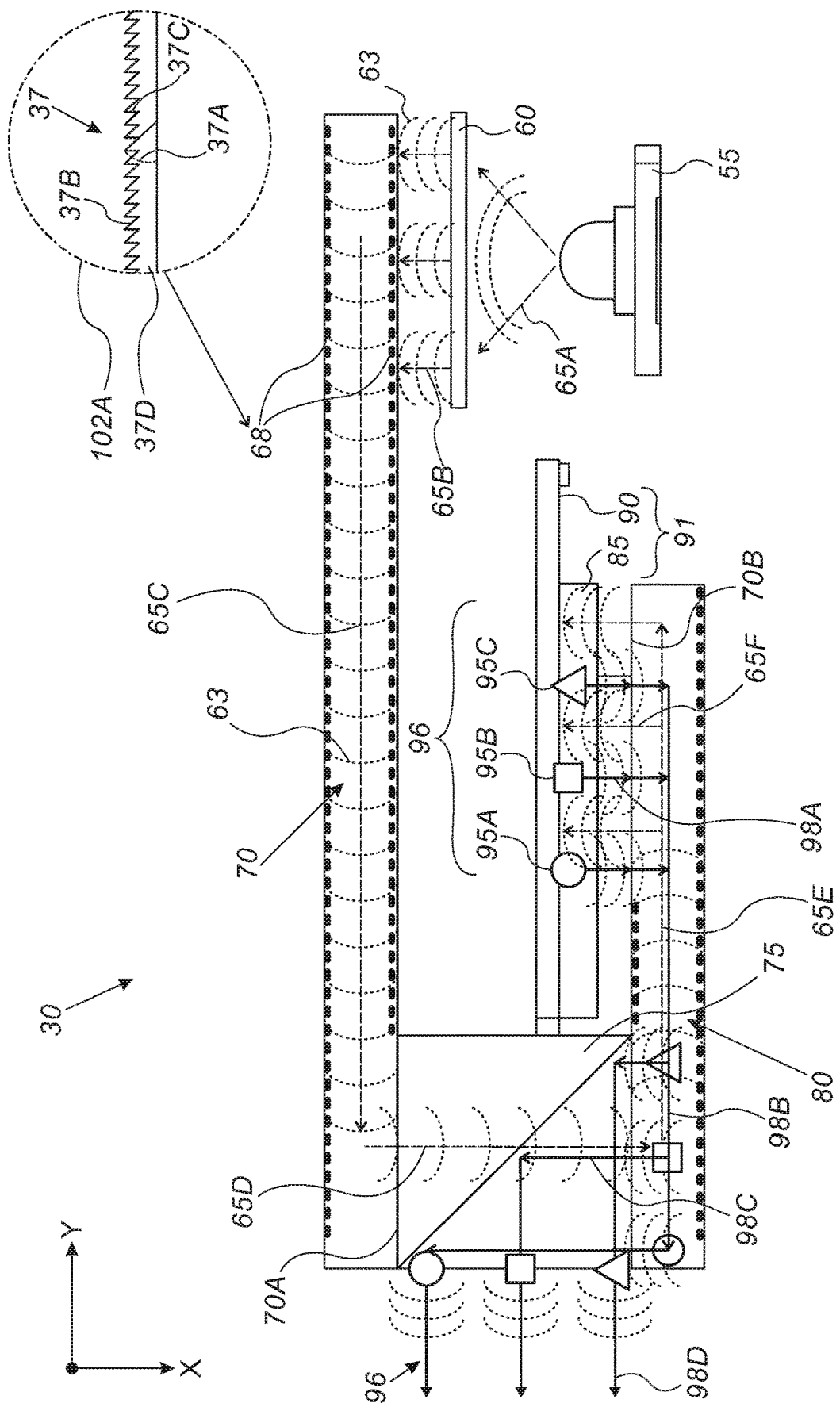
FIG. 3 schematically shows an enlarged cutaway plan view of the image generator of WIFAR, in accordance with an embodiment of the disclosure.
Figure 4A:
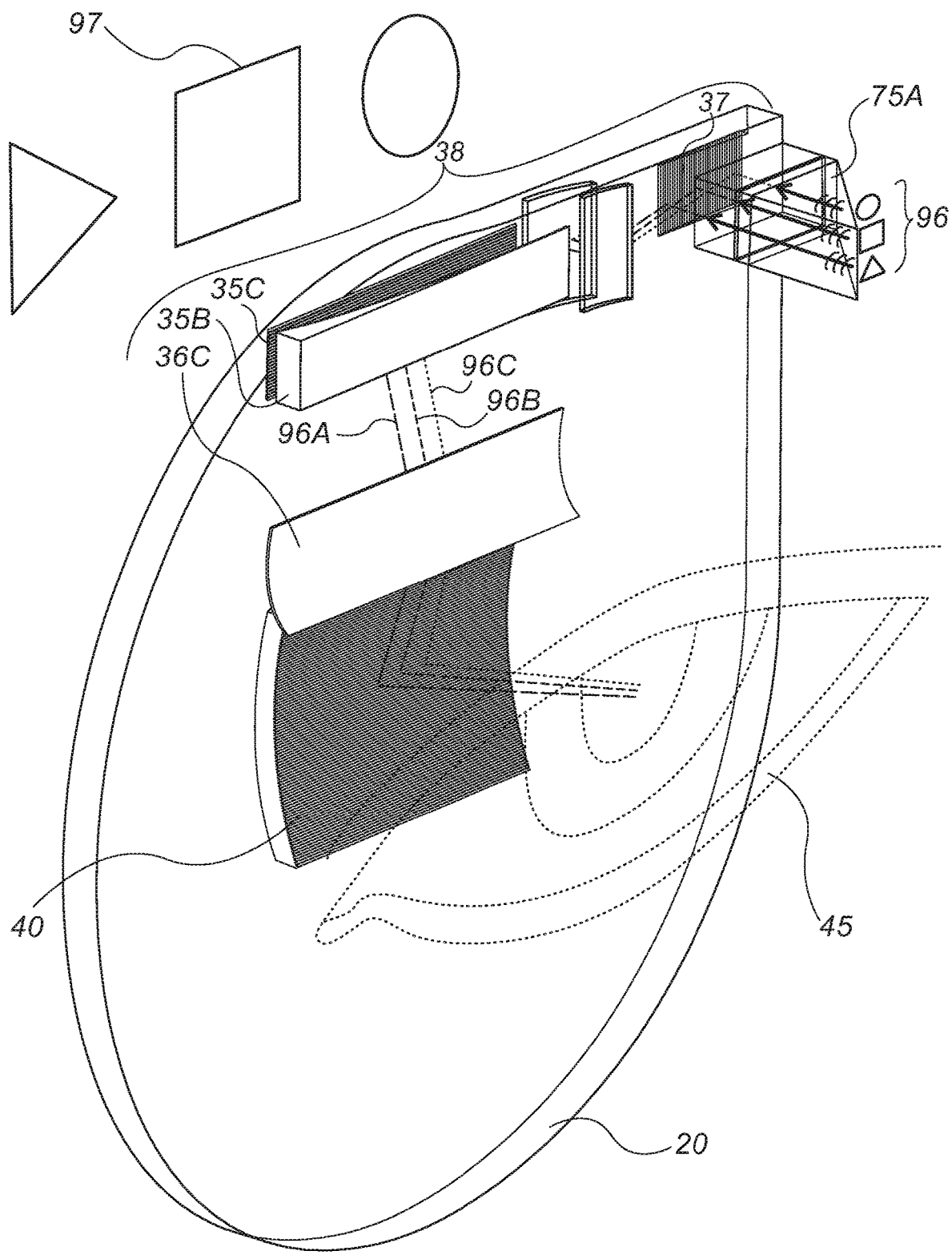
Figure 4B:
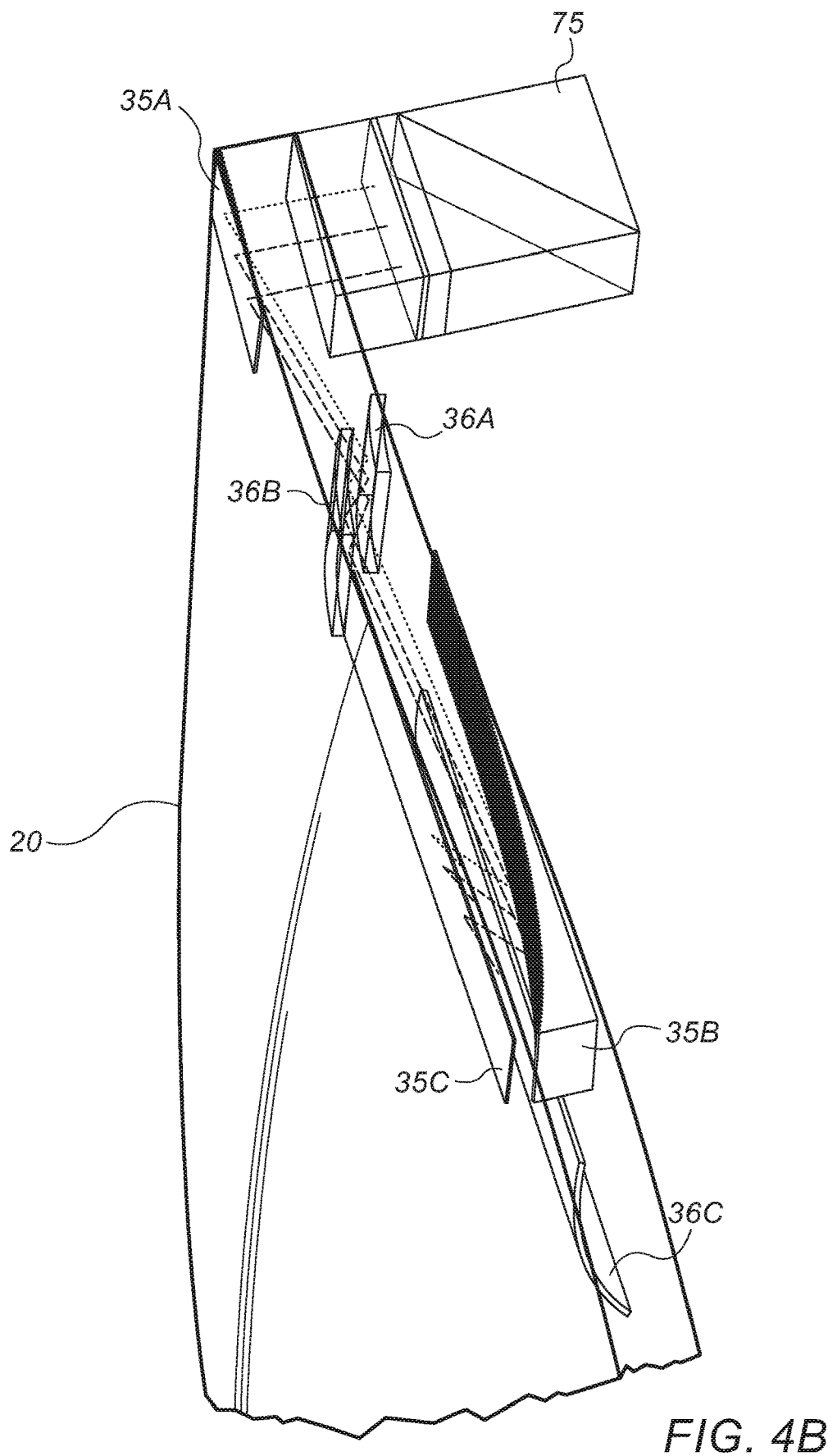
Figure 5:
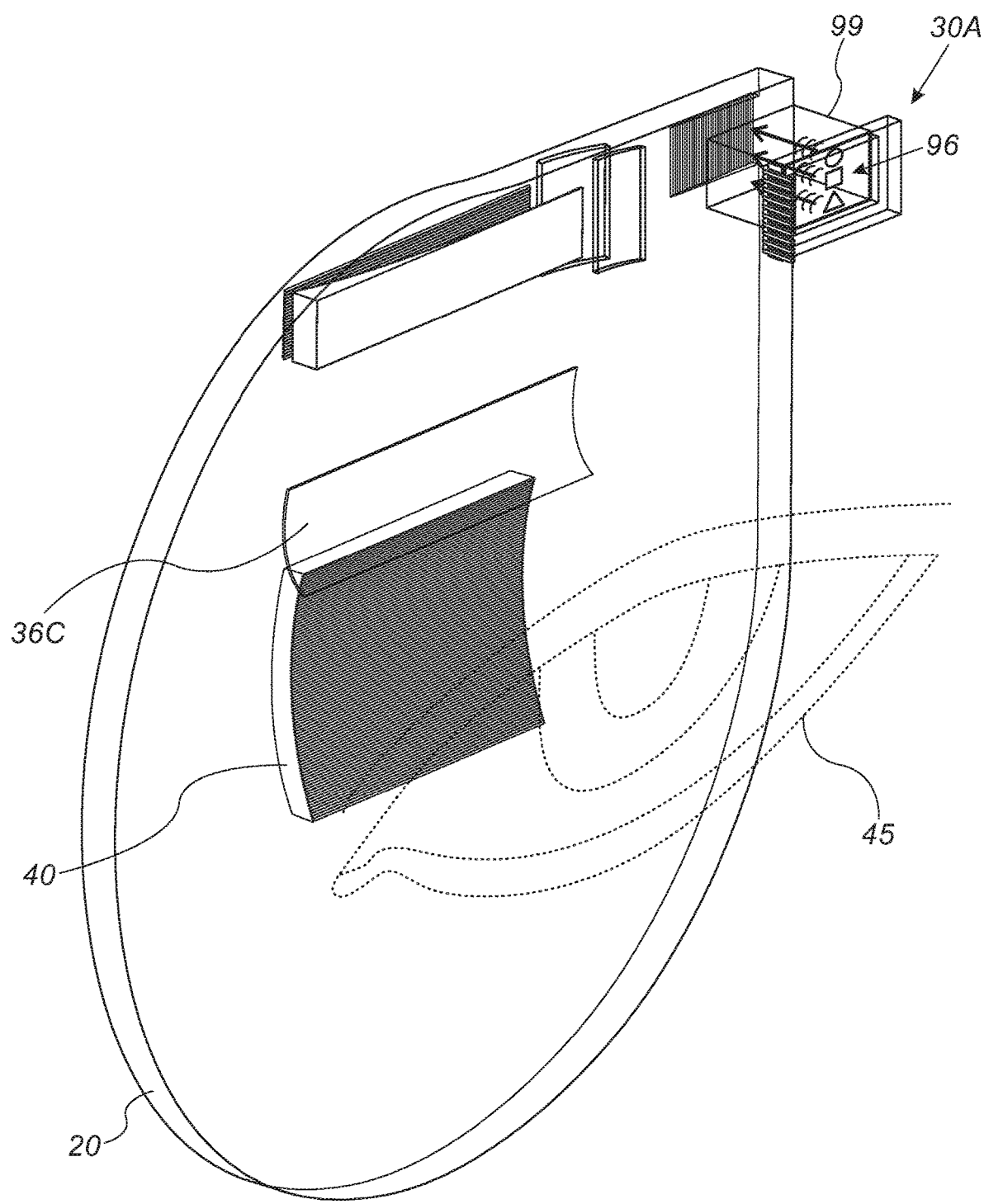
FIG. 5 schematically shows an OLED type image generator that may be comprised in WIFAR eyeglasses, in accordance with an embodiment of the disclosure.
Figure 6:
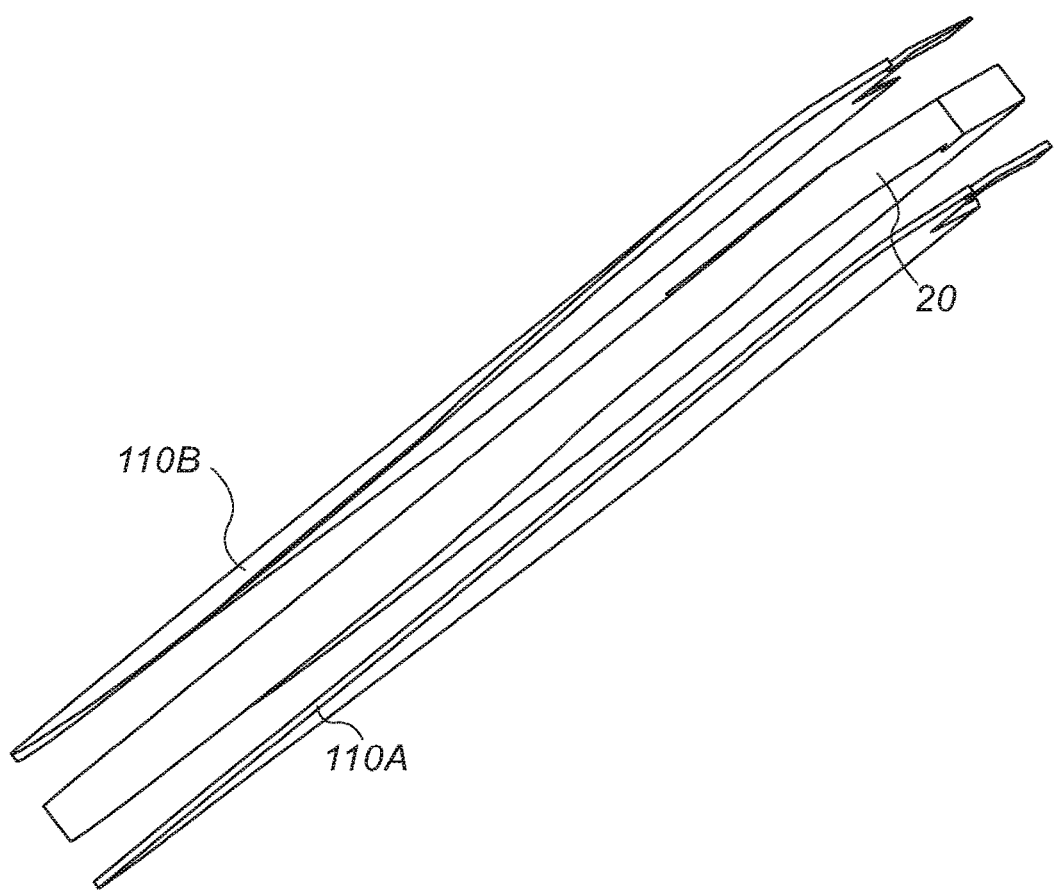
FIG. 6 schematically shows optical appliques for placement on a WIFAR lens, in accordance with an embodiment of the disclosure.
Figure 7:
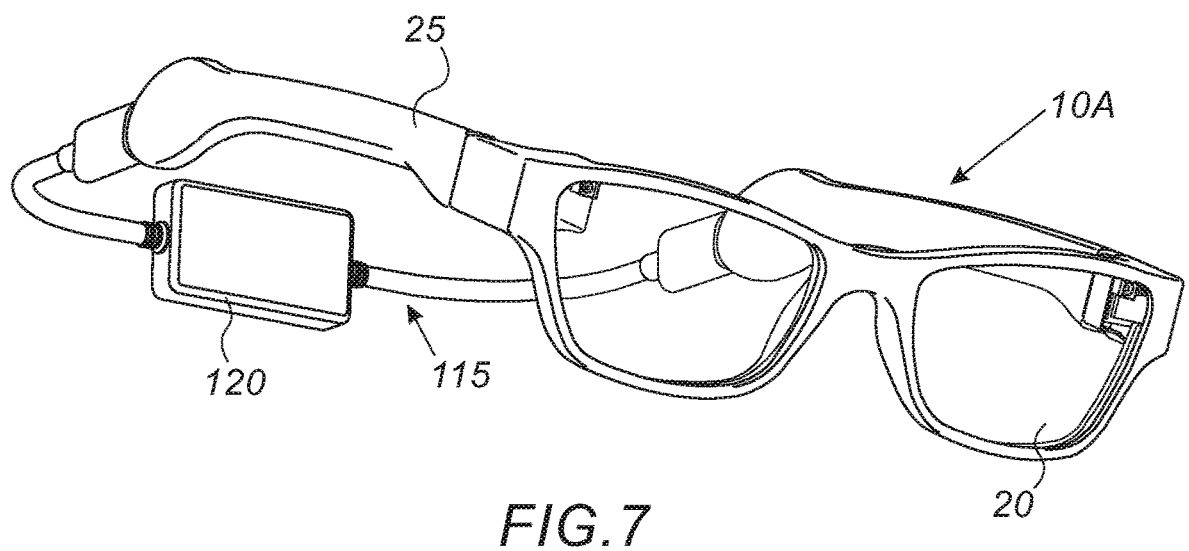
FIG. 7 schematically shows WIFAR eyeglasses having a strap housing with a back-head strap, in accordance with an embodiment of the disclosure.

In the detailed description below, aspects of WIFAR in accordance with an embodiment of the disclosure are discussed with reference to components of WIFAR schematically shown in FIGS. 1-7. FIG. 1 illustrates features of an embodiment of WIFAR eyeglasses having an image generator, transfer optics, and an image presenter, in accordance with an embodiment. FIGS. 2A, and 2B illustrate features of an image generator, transfer optics and an image presenter controllable to provide an AR image to an eye of a wearer. FIG. 3 schematically shows details of the AR image generator shown in FIGS. 2A and 2B, and optical components that provide the image generator with an innovative folded light path for propagating an image towards a user's eye for display. Configuration of the optical elements contribute to providing WIFAR with a relatively compact, light-weight structure. FIGS. 4A, 4B, and 4C schematically show an eyeglass lens comprised in the WIFAR glasses having the transfer optics and an image presenter integrally formed in the lens in accordance with an embodiment of the disclosure. FIG. 4E shows dimensions of the transfer optics, in accordance with an embodiment. FIG. 5 schematically shows a variation of WIFAR in which an image generator comprises an OLED. FIG. 6 schematically illustrates optical appliques in an embodiment of WIFAR. FIG. 7 schematically illustrates a WIFAR having a housing attached to a back-head strap which may advantageously house components of the WIFAR.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

FIG. 1 schematically shows WIFAR eyeglasses 10 having lenses 20 integrally formed having transfer optics 38 comprising optical elements 35C and -C discussed below, and an image presenter 40, and an eyeglass temple bar 25 comprising an image generator 30, in accordance with an embodiment of the disclosure. In an embodiment, the transfer optics and the image presenter may be in one or both lenses 20 of WIFAR 10. Optionally, the lenses are made of any one of or any combination of a polycarbonate material or a polymethyl methacrylate material.

FIGS. 2A and 2B schematically show enlarged images that show details of lens 20 and AR image generator 30, hereinafter optionally referred to as image generator. To facilitate description of some embodiments, the locations of WIFAR optics elements are described below with reference to an XYZ coordinate system 18 of FIG. 2A wherein the Y axis is substantially parallel to the temple bar and the X axis perpendicular to the temple bar. The image generator is shown in greater detail in inset 101 of FIG. 2B.

In an embodiment, image generator 30 comprises a light source 55, diffuser 60 and a first reflective diffraction waveguide or first waveguide 70. The light source, the diffuser and the first waveguide are configured to create and direct light towards an image maker 91 having components and shown in an inset 101 in FIG. 2B. The image generator further comprises a one-way beam splitter 75 and a second waveguide 80, that propagates light from the first waveguide 70 to image maker 91 and propagates the light encoded with an image produced by the image maker from the light, to transfer optics 38. FIG. 3 discussed below schematically illustrates in a plan cutaway view the folded light path in accordance with an embodiment of the disclosure.

FIG. 3 schematically shows a cutaway plan view of image generator 30 that illustrates paths that light generated by light source 55 and processed by image maker 91 travel in the image generator. Light that light source 55 emits is schematically represented by dashed arcs 63 and direction of propagation of the light by dashed arrows 65A-F. In an embodiment, light 63 from light source 55 propagates in directions schematically represented by dashed arrows 65A, passes through diffuser 60 and continues in directions indicated by dashed arrows 65B to enter first waveguide 70. The first waveguide optionally comprises minor image reflective diffraction gratings schematically represented by thick dashed lines 68. Inset 102A schematically shows the reflective gratings represented by thick dashed lines may comprise parallel rows of optical, micro-triangular rulings 37 supported by a substrate, hereinafter referred to as triangular rulings 37. In some embodiments, each triangular tooth 37 comprises a straight leg surface 37C and a slanted leg surface 37B formed on a substrate 37D.

The first waveguide operates to propagate light 63 from the diffuser along a direction of the first wave guide indicated by a dashed arrow 65C to reach an exit aperture 70A of the first waveguide facing one-way beam splitter 75. The exit aperture allows light 63 indicated by a dashed arrow 65D to pass through the one-way beam splitter and enter second waveguide 80.

In an embodiment, second waveguide 80 propagates light 63 along a length of the second waveguide in a direction indicated by a dashed arrow 65E to an aperture 70B facing image maker 91. The image maker optionally comprises an LCoS 85 mounted to a printed circuit board controller 90, which is operable to control the LCoS. Light 63 exits the waveguide through aperture 70B in directions indicated by dashed arrows 65F to enter the LCoS. The LCoS processes the received light to generate light encoded with an image or an encoded light image, hereinafter encoded light 96, comprising features represented by icons 95A, 95B and 95C. An encoded light path from LCoS to transfer optics 38, discussed in detail below, is schematically represented by solid line arrows 98A-D. AR encoded light 96 returns along path 98A from the LCoS back to second waveguide 80 via aperture 70B from which the light came.

Second waveguide 80 optionally propagates encoded light 96 on path 98B, back along the length of the waveguide and continues to propagate the encoded light back into the one-way beam splitter on image path 98C. One-way beam splitter 75 reflects the encoded light received from the second waveguide and directs the encoded light on path 98D to an exit aperture of the image generator 30 and enter transfer optics 38.

The unique light folding image generator 30 described above is relatively small and may be housed in temple bar 25 of eyeglasses 10 (FIG. 1) and allows for the eyeglasses to provide improved comfort and utility to the eyeglass wearer. By way of example, image generator 30 may have a width parallel to the x-axis (FIG. 2A) that is less than or equal to about 10 mm.

FIGS. 4A-4C schematically show transfer optics 38, in an embodiment, integrally formed in lens 20 and the transfer optics further comprise non-diffractive reflectors 36A, 36B and 36C, and reflective gratings 35A, 35B and 35C. Optionally, reflectors 36A-C are minors that are operable to enlarge and propagate the encoded light. FIG. 4A schematically shows tracing of encoded light 96 from a portion of one-way beam splitter 75A of the image generator to image presenter 40. Tracing of the encoded light through the lens 20 is schematically indicated by three different dashed lines 96A, 96B and 96C. FIG. 4B is a considerably enlarged schematic illustration of the transfer optics 38 as shown in FIG. 4A. FIG. 4C is a considerably enlarged schematic illustration of rounded reflector 36C and image presenter 40 as shown in FIG. 4A.

Figure 4D:
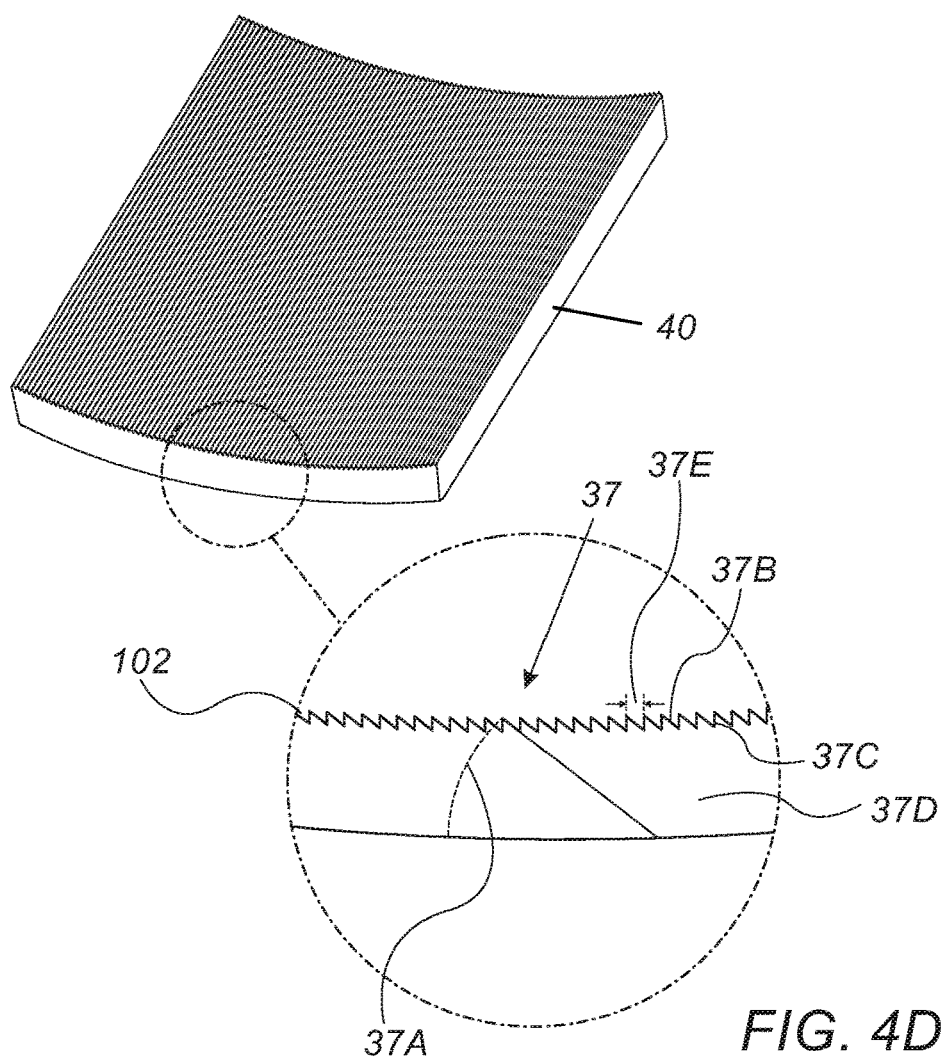
FIG. 4D schematically shows a feature of the image presenter, in accordance with an embodiment of the disclosure.
Figure 4E:
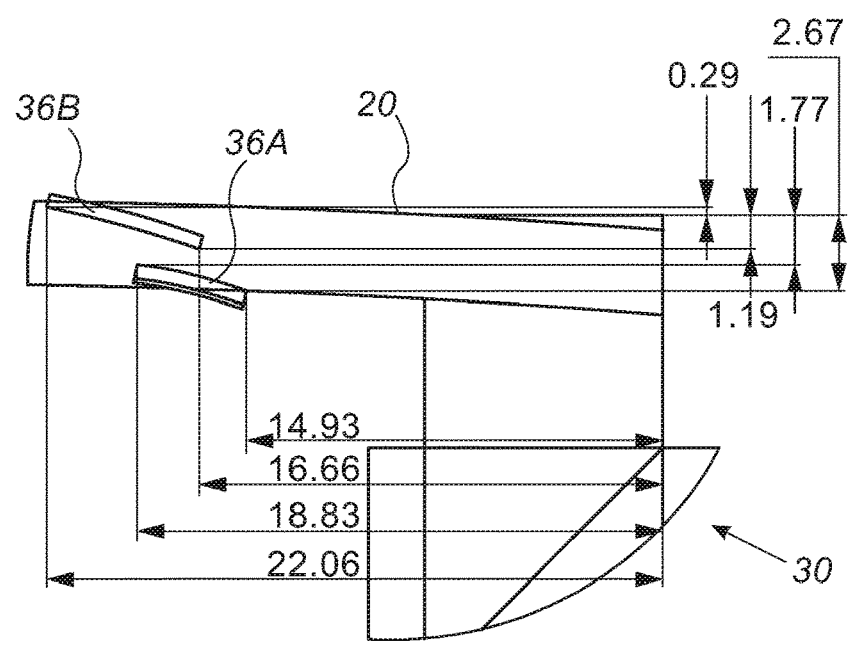
FIG. 4E shows dimensions of WIFAR optical elements integrally formed in a lens of WIFAR, in accordance with an embodiment of the disclosure.

FIG. 4D schematically shows image presenter 40 with enlargement and detail of optional triangular rulings 37. Inset 102 of FIG. 4D is a plan cutaway view of triangular rulings 37. The triangular rulings may be used in at least one or in any combination of reflective gratings 35A-C and image presenter 40. Optionally, the reflective gratings on the transfer optics are specular gratings that may be made by coating the gratings with silver and aluminum which reflect the encoded light as a mirror. In some embodiments, each triangular ruling of reflective gratings rulings 37 comprises a straight leg 37C and a slanted leg 37B connected by a substrate 37D.

In an embodiment, reflectors 36 A-C and reflective gratings 35 A-C of transfer optics 38 further comprise a corner reflective grating 35A. The corner reflective grating operates to transmit the encoded light received from the image generator and may propagate encoded light 96 diagonally along both the X and Y axis to a first curved reflector 36A. Corner reflective grating 35A may further comprise triangular rulings 37 placed along the Z axis. Optionally, the encoded light is received to a convex surface of the first curved reflector. The first curved reflector operable to propagate the encoded light diagonally along both the X and Y axis to a second curved reflector 36B. Optionally, the encoded light is received to a concave surface of the second curved reflector. In an embodiment, the second curved reflector is configured to receive the encoded light from the first curved reflector and propagate the Encoded light diagonally along both the X and Y axis to a curved reflective grating 35B. The first and second curved reflectors are optionally offset corresponding to the X axis rotating about the Z axis and are optionally curved having a continuous radius.

The curved reflective grating may further comprise triangular rulings 37 oriented along the Z axis and may be configured to propagate encoded light 96 along the Y axis to a descending reflective grating 35C. The curved reflective grating in some embodiments is curved along the X axis and receives the encoded light on a concave side of the curved reflective grating. The descending reflective grating optionally faces curved reflective grating 35B and further comprises triangular rulings 37 oriented along the X axis. Descending reflective grating 35C is operable to propagate the encoded light along a Z axis to rounded reflector 36C. The rounded reflector is optionally curved along the Z axis and is configured to receive the encoded light from the descending reflective grating. Optionally, the rounded reflector receives the encoded light to a convex surface of rounded reflector 36C.

The rounded reflector is further operable to propagate encoded light 96 along the Z axis from transfer optics 38 to image presenter 40. The image presenter is optionally curved along the Z axis and may further comprise triangular rulings 37 on a concave surface of image presenter 40. Optionally, the triangular rulings on the image presenter are oriented along the X axis and on the slant leg surface of the rulings is made of a ratio between 25 percent reflective metal to 75 percent transparent material. In some embodiments, the image presenter may be curved along two orthogonal planes.

The image presenter of WIFAR 10 is operable to receive the encoded light on a convex surface and present the encoded light as a virtual augmented reality image 96 to eye 45 of a wearer. Eye 45 of the wearer will then perceive the virtual augmented reality image in the distance 97 as superimposed on the real environment and the virtual augmented reality image enters the eye in parallel. Transfer optics 38 and image presenter 40 are optionally configured to result in an enlarged FOV for the wearer of about 90 degrees.

Moving now to FIG. 5, transfer optics 38 and image presenter 40 resemble those seen in FIGS. 2A, 2B, 4A, 4B, 4C and 4D. Optionally, image generator 30A is an OLED which is an image maker and light source combined configured to transfer encoded light 96 directly to the transfer optics. In some embodiments, an adaptive transparent lens 99 is used to mount the substantially flat OLED to a curvature of the lens. OLED 30A further comprises an active area that may be about 8.44 mm along X axis by 4.9 mm along the Z axis on a base printed circuit board which may be about 11.5 mm along X axis by 7 mm along the Z axis (not shown). Therefore, OLED 30A may be between about 11 mm to 12 mm along an X axis by about 6.5 mm to 7.5 mm along the Z axis. The depth of the OLED active area and printed circuit board along the Y axis may be between about 1.5 mm to 3 mm and optionally about 2.3 mm. This smaller scale of the OLED may be advantageous to the size, weight and comfort of the eyeglasses on the wearer.

FIG. 6 schematically illustrates optical appliques 110, mounted on at least a front or back side of lens 20. Optionally the optical appliques 110A and 110B are on both the front and back side of the lens. In some embodiments, optical appliques 110 are configured to protect lens 20 and they also may be configured to correct vision of the wearer. Vision correcting optical appliques 110 result in WIFAR eyeglasses 10 that may be used for vision correction independently of being AR image eyeglasses. The virtual augmented reality image capabilities of the WIFAR are only available when the light source is activated. Therefore, when the light source is not activated the virtual augmented reality image is not projected and the WIFAR may now be used for vision correction only.

FIG. 7 illustrates an embodiment of the eyeglasses 10A having a housing 120 attached to a back-head strap 115 for various elements or components needed for the WIFAR. By way of example, the housing may house a battery to power the WIFAR.

By way of numerical example and referring to FIG. 4D inset 102 and to FIG. 3 inset 102A both detailed and enlarged schematic views of triangular rulings 37. The triangular rulings may have a height from the substrate of between about 0.005801 mm to 0.00643 mm. An angle 37A between slanted leg 37B and the substrate 37D may be between about 39 to 43 degrees and optionally between about 40 to 42 degrees. A distance 37E between the triangular rulings may be about 0.00766 mm and the slant leg of each tooth is about 0.01 mm.

Also, by way of numerical examples, lens 20 of WIFAR 10 may be about 3 mm thick. First curved reflector 36A and second curved reflector 36B are substantially parallel and overlap each other by about 2.17 mm. The first curved reflector has a continuous radius curve of between about 55 mm to 150 mm and optionally 110 mm. The second curved reflector has a continuous radius curve of between about 250 mm to 500 mm Curved reflective grating 35B optionally has a variable radius curve. One end of the curved reflective located nearby to the first and second curved reflectors of WIFAR 10 has a curve radius along the X axis of between about 50.25 mm to 124.5 mm A second end of curved reflective grating 35B has a curve radius along the X axis of between about 25.25 mm to 125.5 mm Rounded reflector 36 C has a continuous radius along a Z axis of about 40 mm.

Numerical examples of the image presenter include that image presenter 40 may have a length of about 13.61 mm along the Z axis and 23.73 mm along the X axis. Further the image presenter is curved along the Z axis and the radius of the curve changes along the Z axis curve. A top area of the image presenter nearby to the rounded reflector has a radius of the curve between about 50.25 mm to 100.5 mm. In a bottom area of the image presenter, opposite top area, the radius of the curve is between about 25.25 mm to 50.5 mm FIG. 4E is another numerical example for placement of optical elements of the transfer optics and the image presenter in lens 20 of WIFAR 10.

Whereas, transfer optics 38 and image presenter 40 and image generators 30 and 30A are described herein and in the figures with specific examples, it is noted that the transfer optics and image presenter may be used with any image generator that will introduce an image into the transfer optics. Similarly, image generators 30 and 30A may be used with any transfer optics and/or image presenter and further may be used in any apparatus that requires an image to be produced.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to users of the art. The scope of the disclosure is limited only by the claims.

The invention claimed is:

1. Apparatus An apparatus for presenting augmented reality images to an eye of a wearer, the apparatus comprising:
   an image generator configured to produce an encoded light image;
   an image presenter curved in one direction having reflective gratings on a concave surface of the curve and configured to present the encoded light image as a virtual augmented reality image to the eye of the wearer;
   a transfer optics system configured to propagate the encoded light image from the image generator to the image presenter,
   wherein the reflective gratings are a substrate supporting parallel rows of triangular reflective gratings.

2. The apparatus of claim 1, wherein the transfer optics system further comprises reflectors and reflective gratings.

3. The apparatus of claim 1, wherein the apparatus is a pair of eyeglasses and the eyeglasses further comprise at least one lens; and the transfer optics system and image presenter are integrally formed in the least one lens.

4. The apparatus of claim 3, wherein the apparatus further comprises an optical applique mounted onto at least one side of the at least one lens.

5. The apparatus of claim 4, wherein the optical applique is configured to correct vision.

6. The apparatus of claim 3, wherein the at least one lens is configured fit in standard eyeglass frames.

7. The apparatus of claim 1, wherein each row of the reflective grating is configured to have a straight leg and a slanted leg connected by the substrate.

8. The apparatus of 7, wherein the angle between the substrate and slant leg is between 39 to 43 degrees.

9. The apparatus of claim 1, wherein the parallel rows of the reflective gratings are oriented on perpendicular axis in relation to the curve of the image presenter.

10. The apparatus of claim 1, wherein the image generator is an OLED.

11. The apparatus of claim 1, wherein the image generator comprises:
    a light source, an image maker configured to receive light and produce an image, and an exit aperture for the image, and the image generator further comprising:
    a first waveguide configured to collect light from the light source;
    a one-way beam splitter configured to receive light from the first waveguide;
    a second waveguide parallel to the first waveguide configured to propagate the light from the one-way beam splitter to the image maker and propagate the image produced by the image maker back to the one-way beam splitter; and
    the one-way beam splitter further configured to receive the image and propagate the image to the exit aperture.

12. An apparatus for presenting augmented reality images to an eye of a wearer, the apparatus comprising:
    an image generator configured to produce an encoded light image;
    an image presenter curved in one direction having reflective gratings on a concave surface of the curve and configured to present the encoded light image as a virtual augmented reality image to the eye of the wearer;
    a transfer optics system configured to propagate the encoded light image from the image generator to the image presenter,
    wherein the transfer optics system further comprises reflectors and reflective gratings,
    wherein the reflectors and reflective gratings of the transfer optics system further comprises:
    a corner reflective grating configured to transmit the encoded light image received from the image generator to a first curved reflector; and
    a second curved reflector configured to propagate the encoded light image from the first curved reflector to a curved reflective grating; and
    the curved reflective grating configured to propagate the encoded light image from the second curved reflector to a descending reflective grating; and
    a rounded reflector configured to receive the encoded light image from the descending reflective grating and propagate the encoded light image from the transfer optics to the image presenter.

* * * * *